United States Patent
Davis et al.

(10) Patent No.: US 6,225,409 B1
(45) Date of Patent: May 1, 2001

(54) FLUOROSILICONE INTERPENETRATING NETWORK AND METHODS OF PREPARING SAME

(75) Inventors: Stephen V. Davis, Rochester; Jiann-Hsing Chen, Fairport; Nataly Boulatnikov, Ontario, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/156,831

(22) Filed: Sep. 18, 1998

(51) Int. Cl.[7] .............. C08L 83/04; C08L 83/06; C08L 83/10; C08L 27/22

(52) U.S. Cl. .............. 525/104; 525/100; 525/101; 525/474; 525/479; 526/242; 526/250; 526/253; 526/254; 526/255

(58) Field of Search .................. 428/421, 422, 428/447; 525/100, 101, 104, 474, 479; 526/242, 250, 253, 254, 255; 528/25, 33, 35

(56) References Cited

U.S. PATENT DOCUMENTS

| | | | |
|---|---|---|---|
| 4,264,181 | 4/1981 | Lentz et al. | 355/3 FU |
| 4,272,179 | 6/1981 | Seanor | 355/3 FU |
| 4,387,176 | 6/1983 | Frye | 524/268 |
| 4,536,529 | 8/1985 | Frye et al. | 524/284 |
| 4,853,737 | 8/1989 | Hartley et al. | 355/289 |
| 5,141,788 | 8/1992 | Badesha et al. | 428/36.8 |
| 5,166,031 | 11/1992 | Badesha et al. | 430/124 |
| 5,534,347 | 7/1996 | Chen et al. | 428/421 |
| 5,582,917 | 12/1996 | Chen et al. | 428/421 |
| 5,695,878 | 12/1997 | Badesha et al. | 428/334 |

OTHER PUBLICATIONS

3M Processing Digest, vol. 17(3), Oct. 1986.

*Primary Examiner*—Vivian Chen
(74) *Attorney, Agent, or Firm*—Doreen M. Wells

(57) ABSTRACT

A method of making a polymeric composition comprising a fluorocarbon-silicone interpenetrating network, comprising the steps of:

a) mechanically compounding a fluorocarbon copolymer and metal oxide or hydroxide acid acceptor to form a homogenous mixture; and b) dispersing in solvent the mixture formed by step a) with a polymer selected from a curable polyfunctional poly($C_{(1-6)}$ alkyl)siloxane polymer; a curable polyfunctional poly($C_{(1-6)}$ alkyl)arylsiloxane polymer; and combinations thereof, and c) solution milling the dispersion of b) to form a homogeneous blend.

17 Claims, No Drawings

FLUOROSILICONE INTERPENETRATING NETWORK AND METHODS OF PREPARING SAME

CROSS REFERENCE TO RELATED APPLICATIONS

Reference is made to commonly-assigned copending U.S. patent application Ser. No. 09/156,996 filed Sep. 18, 1998, U.S. Pat. No. 6,075,966, entitled RELEASE AGENT DONOR MEMBER WITH FLUOROSILICONE INTERPENETRATING NETWORK, by Stephen Davis, Jiann-Hsing Chen, Muhammed Aslam and Fangsheng Wu, and U.S. patent application Ser. No. 09/157,391 filed Sep. 18, 1998, U.S. Pat. No. 6,067,438, entitled FUSER MEMBER WITH FLUOROSILICONE IPN NETWORK AS FUNCTIONAL RELEASE AGENT DONER ROLLER, by Jiann-Hsing Chen, Stephen Davis, Biao Tan, James Mathers and Bordon Mills, the disclosure of which is incorporated herein.

FIELD OF THE INVENTION

The present invention relates to methods of making polymeric compositions suitable for coating articles such as toner fusing members. More particularly, the invention relates to a fluorocarbon-silicone polymeric composition and methods for preparing it.

BACKGROUND OF THE INVENTION

In certain electrostatographic imaging and recording processes, for instance, in electrophotographic copying processes, an electrostatic latent image formed on a photoconductive surface is developed with a developer which is a mixture of carrier particles, e.g., magnetic particles, and a thermoplastic toner powder which is thereafter fused to a receiver such as a sheet of paper. The fusing member can be a roll, belt or any surface having a suitable shape for fixing thermoplastic toner powder images to a substrate. The fusing step commonly consists of passing the substrate, such as a sheet of paper on which toner powder is distributed in an imagewise pattern, through the nip of a pair of rolls, at least one of which is heated. Where the fusing member is a belt it is preferably a flexible endless belt having a smooth, hardened outer surface which passes around a heated roller.

A persistent problem in this operation is that when the toner is heated during contact with the heated roll or belt it may adhere not only to the paper but also to the fusing member. Any toner remaining adhered to the member can cause a false offset image to appear on the next sheet and can also degrade the fusing member. Other potential problems are thermal degradation and abrasion of the member surface which results in an uneven surface and defective patterns in thermally fixed images.

Toner fusing rolls have a cylindrical core which may contain a heat source in its interior, and a resilient covering layer formed directly or indirectly on the surface of the core. Roll coverings are commonly fluorocarbon polymers or silicone polymers, such as poly(dimethylsiloxane) polymers, of low surface energy which minimizes adherence of toner to the roll. Frequently release oils composed of, for example, poly(dimethylsiloxanes), are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Toner fusing belts are composed of a continuous flexible material having a smooth surface and superior resistance to heat. The belt substrate can be metallic or polymeric. The surface of the belt is composed of a thinly coated, low surface-energy polymer such as a fluorocarbon or a silicone-polymer.

Fusing members with a surface coating of a fluoroelastomer, especially vinylidene fluoride based fluoroelastomers, possess excellent heat, oil and chemical resistance as well as good fatigue and wear characteristics. However, fluoroelastomers with these excellent chemical and mechanical properties have a propensity to interact with toners, especially those formulated from polyesters, causing premature offset.

U.S. Pat. No. 4,264,181 discloses fusing members coated with a metal-filled elastomer surface obtained by nucleophilic-addition curing of a mixture of a metal filler and a vinylidene fluoride-hexafluoropropylene copolymer. Mixtures of the fluoroelastomers with silicone rubbers were mentioned (column 8, lines 26–29) but no specific examples of suitable silicones are taught. The surface coatings disclosed are used in conjunction with functionally substituted polymeric release agents capable of interacting with the metal component.

U.S. Pat. No. 4,853,737 discloses a roll useful in electrostatography having an outer layer comprising cured fluoroelastomers containing pendant polydiorgano-siloxane segments that are covalently bound to the backbone of the fluoroelastomer. Unlike the current invention, this material shows poor wear properties and requires functional release fluids. Also the silicon content described in this patent must be kept very low in practice to avoid incompatibility. U.S. Pat. No. 5,141,788; U.S. Pat. No. 5,166,031; and U.S. Pat. No. 5,695,878 disclose a fuser member comprising a supporting substrate having an outer layer of a volume grafted elastomer which is a substantially uniform integral interpenetrating network of a hybrid composition of a fluoroelastomer and a polyorganosiloxane, where said volume graft has been formed by dehydrofluorination of said fluoroelastomer by a nucleophilic dehydrofluorinating agent, followed by addition polymerization by the addition of an alkene or alkyne functionally terminated polyorganosiloxane and a polymerization initiator. The disadvantage of this is that it usually involves at least two extra reaction steps to produce higher silicone contents without phase separation. Also the resulting network structure forms a higher silicone concentration on the surface through stratification and as such has poorer wear resistance.

U.S. Pat. No. 5,534,347 discloses toner fusing rolls having an oil barrier layer composed of a substrate coated with a fluorocarbon-silicone polymeric composition which is obtained by concurrently curing a fluorocarbon copolymer, a nucleophilic fluorocarbon-curing agent and a heat curable polyfuctional poly ($C_{1-6}$ alkyl)arylsiloxane polymer. This patent does not describe release layer as the surface energy of the resulting material was too high.

Similarly, U.S. Pat. No. 5,582,917 discloses toner fusing members having a surface layer comprising a substrate coated with a fluorocarbon-silicone polymeric composition obtained by concurrently curing a fluorocarbon copolymer, nucleophilic fluorocarbon curing agent and a heat curable polyfunctional polymethylsiloxane polymer. The disadvantage of these last two patents is in the production methods needed to manufacture these materials. In these patents, mechanical mixing is described as being necessary to eliminate phase separation of the silicone from the fluorocarbon phases. In general the two phases are forced into intimate contact with the possibility of some measure of reaction within both of the phases. This reaction effectively eliminated the tendency for bulk phase separation. However the processability, if practiced as described, would decrease the shelf life of the dry material.

Although the properties of the materials described in the last two patents are suitable, the required processing decreases their usefulness in terms of cost and time or energy dissipation. Thus, there is still a need for manufacturable coating composition based on fluorocarbon copolymers which resist abrasion, interact minimally with toners and resist offset while retaining the advantageous mechanical and chemical properties characteristic of fluoroelastomers.

SUMMARY OF THE INVENTION

The present invention relates to a method of making a polymeric composition containing a fluorocarbon-silicone interpenetrating network, comprising the following steps:

a) compounding a fluorocarbon copolymer and metal oxide or hydroxide acid acceptor to form a homogenous mixture; and b) milling the mixture formed by step a) with a polymer selected from a curable polyfunctional poly($C_{(1-6)}$ alkyl)siloxane polymer; a curable polyfunctional poly($C_{(1-6)}$ alkyl)arylsiloxane polymer; and combinations thereof, to form a homogenous blend.

In another aspect of the invention, there is provided the added steps of:

adding, in the milling or the compounding step, a fluorocarbon-curing agent and a fluorocarbon-curing accelerator.

In yet another aspect of the invention, there is further provided, after preparing the polymeric interpenetrating network, the additional steps of:

removing gasses dissolved in the polymeric composition; and coating the article with the polymeric composition.

The concurrent curing of the components of the polymeric mixture creates an interpenetrating network of the individually cured polymers. The polymeric mixture is suitable for coating articles such as fusing rollers of fusing belts. The coating may be applied directly to a substrate or to a layer intermediate between the substrate and the coating, such as a base cushion layer.

DETAILED DESCRIPTION OF THE INVENTION

The coating composition is obtained by compounding the fluorocarbon copolymer, metal oxide or hydroxides to act as acid acceptors, fluorocarbon-curing agent with a fluorocarbon-curing accelerator and optionally other fillers to form a material suitable for dispersion in a solvent. The accelerator and fillers are optional; the curing agent may be omitted at this stage and added just before the composition is applied as a coating to a surface. The accelerator promotes crosslinking between the curing agent and the fluorocarbon copolymer.

As used herein, the term "copolymer refers to the product of polymerization of two or more substances at the same time, for example terpolymers which contain three distinct monomers.

Prior to coating this material, a curable polyfunctional poly($C_{(1-6)}$ alkyl)siloxane polymer and/or a curable polyfunctional poly($C_{(1-6)}$ alkyl)arylsiloxane polymer is added. The siloxane polymer is preferably heat-curable and can comprise one or more polyfunctional poly($C_{(1-6)}$ alkyl) siloxane polymers, copolymers, polyfunctional poly($C_{(1-6)}$ alkyl)arylsiloxane polymer or reaction products of such materials. The siloxane polymer is cured concurrently with the fluorocarbon copolymer. The resulting mixture is solution milled to form a homogeneous mixture suitable for coating in thin film applications.

While not wishing to be bound by any particular theory, it is believed that the concurrent curing of the individual polymers of the mixture results in an interpenetrating network of the separately crosslinked polymers. That is, the network formed by crosslinking the fluorocarbon copolymer with the fluorocarbon-curing agent and the network formed by crosslinking of the polyfunctional siloxane polymer mesh together to create an interpenetrating polymeric network. The cured polymeric mixture forms a coating with advantageous release properties attributable to the silicones and mechanical and chemical properties characteristic of the fluorocarbon copolymer are retained.

Fluorocarbon copolymers and silicones tend to phase separate because, on a molecular level, they are incompatible and will not readily mix. Phase separation can be avoided by the methods of the instant invention. Specifically:

compounding the fluorocarbon copolymers and the optional addenda, such as the curing agent, accelerators and fillers to form an intimate, homogeneous, solid mixture; and dispersing the solid mixture along with the curable polyfunctional poly($C_{(1-6)}$ alkyl)siloxane polymer and/or curable polyfunctional poly($C_{(1-6)}$ alkyl)arylsiloxane polymer with a molecular weight sufficient to allow dispersion. Also, the solvent system must not hinder reaction of the silicon phase as such hindered reaction would cause subsequent phase separation. By "suitable solvent" is meant a solvent that can dissolve both phases and will not restrict the silicone cure. One such appropriate solution is 2-butanone preferably containing less then 5% by weight of methanol. Minimal methanol is needed, as distinct from 3M Processing Digest, Vol 17 (3), October 1986, which describes the use of methanol to increase solution pot life. As the reaction rate slows in solution the tendency for phase separation increases. Other suitable solvents include methyl ethyl ketone, methyl isobutyl ketone, ethyl ketone and mixtures of the foregoing containing less than 15% of cosolvents methanol, ethanol and acetone as well as similar solvents/solvent systems as would be known to those skilled in the art.

In a preferred embodiment of the invention the fluorosilicon interpenetrating network comprises a solid fluorocarbon copolymer and a liquid, curable polyfunctional poly($C_{(1-6)}$ alkyl)siloxane polymer, for example, a polyfunctional hydroxy-functionalized poly($C_{(1-6)}$ alkyl) siloxane polymer.

The siloxane polymer preferably has a number average molecular weight range of greater than 20,000 when measured, for example, by size-exclusion chromatography (SEC). The polyfunctional poly($C_{(1-6)}$ alkyl)arylsiloxane polymer preferably has a number average molecular weight range of greater than 2000 when measured, for example, by size exclusion chromatography.

Such components do not readily form homogeneous mixtures due to phase separation. However, the present invention teaches that by solution dispersion in a media conducive to further polymerization of the polyfunctional hydroxy-functionalized poly($C_{(1-6)}$ alkyl)siloxane polymer with the mechanically compounded fluorocarbon copolymer and the optional addenda in the designated sequence and under the conditions taught, suitable compositions can be obtained.

Compounding (mechanical mixing) is preferably carried out in a two-roll mill by compounding the fluorocarbon copolymer, the accelerator and fillers (if present) until a uniform, dry, smooth sheet is obtained. This compounding process can be carried out at a temperature of, for example, from 50° to 70° F. (approx. 10° to 21° C.), preferably from 55° to 65° F. (approx. 13° to 28° C.). Compounding of the mixture prior to addition of the siloxane oil affords an even band in 30 to 60 minutes. The fluorocarbon-curing agent can then be added and compounded in until a uniform, dry, flexible composite sheet is obtained. Variations to the order of addition of the components can be made by those skilled in the art without causing disintegration of the composition. Subsequently, the liquid, curable siloxane polymer is added along with the compounded material (now in sheet form), into a suitable solvent so that the siloxane oil is uniformly distributed and in intimate contact with the fluorocarbon copolymer.

The composition obtained by such a process can be reduced to small particles for dispersing in a coating solvent without phase separation occurring. The particles are small enough to effect solution of the soluble components in less than about 5 hours, thus minimizing gel formation for compositions having a tendency to gel rapidly. Before the composition is applied as a coating, it must be degassed to remove all dissolved gasses.

In yet another aspect of the invention, for example when a solvent transfer coating process is contemplated, the fluorocarbon-curing agent can be withheld from the compounding mixture and added to the coating medium, thus minimizing any tendency for premature curing of the composition.

Suitable fluorocarbon copolymers of the invention include the vinylidene fluoride based fluoroelastomers containing hexafluoropropylene known commercially as Viton® A. Also suitable are the terpolymers of vinylidene fluoride, hexafluoropropylene and tetrafluoroethylene known commercially as Viton® B and Fluorel™ FX-9038. Viton® A and Viton® B and other Viton® designations are trademarks of E.I. Dupont de Nemours and Company, commercially available materials include, for example, vinylidene fluoride-hexafluoropropylene copolymers Fluorel™ FX-2530, Fluorel™ FC 2174 and Fluorel™ FC 2176. Fluorel™ is a trademark of 3M Company. Other vinylidene fluoride based polymers which can be used are disclosed in U.S. Pat. No. 4,272,179 the disclosure of which is hereby incorporated by reference. Mixtures of the foregoing vinylidene fluoride-based fluoroelastomers may also be suitable. Although it is not critical in the practice of this invention, the number-average molecular weight range of the fluorocarbon copolymers may vary from a low of about 10,000 to a high of about 200,000. In the more preferred embodiments, the vinylidene fluoride-based fluoroelastomers have a number-average molecular weight range of about 50,000 to about 100,000.

Suitable fluorocarbon-curing agents or crosslinking agents for use in the process of the invention include the nucleophilic addition curing agents as disclosed, for example, in the patent to Seanor, U.S. Pat. No. 4,272,179, incorporated herein by reference. The nucleophilic addition cure system is well known in the prior art. Exemplary of this cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluoroelastomers useful in the present invention, for example, free radical initiators, such as an organic peroxide, for example, dicumyl peroxide and dichlorobenzoyl peroxide, or 2,5-dimethyl-2,5-di-t-butylperoxyhexane with triallyl cyanurate, the nucleophilic addition system is preferred.

Suitable accelerators for the bisphenol curing method include organophosphonium salts, e.g., halides such as benzyl triphenylphosphonium chloride, as disclosed in U.S. Pat. No. 4,272,179 cited above.

Suitable fillers for producing these composites include mineral oxides, such as alumina, silicate or titanate, and carbon of various grades. Nucleophilic addition-cure systems used in conjunction with fluorocarbon copolymers can generate hydrogen fluoride and thus acid acceptors are added as fillers. Suitable acid acceptors include metal oxides or hydroxides such as magnesium oxide, calcium hydroxide, lead oxide, copper oxide and the like, which can be used as mixtures with the aforementioned fillers in various proportions.

The preferred curable polyfunctional poly($C_{(1-6)}$ alkyl) siloxane and/or a curable polyfunctional poly($C_{(1-6)}$ alkyl) arylsiloxane polymers, useful in the practice of this invention, when cured concurrently with the fluoroelastomers, produce a coating suitable for use as the surface coating of a fusing member. Such coated fusing members have low energy surfaces which release toner images with minimal offset. These coatings can also be advantageously used with small amounts of externally added polymeric release agents, for example mercapto-, amino-, or silane-functionalized polydimethylsiloxanes, to further minimize offset.

Preferred curable polyfunctional poly($C_{(1-6)}$ alkyl) siloxane polymers and/or a curable polyfunctional poly($C_{(1-6)}$ alkyl)arylsiloxane polymer are heat-curable silicones; however peroxide-curable silicones can also be used with conventional initiators. Heat-curable silicones include the hydroxy-functionalized polyfunctional organopolysiloxanes belonging to the class of silicones known as "soft" silicones. Preferred soft silicones are silanol-terminated polyfunctional organopolysiloxanes containing repeating units of the formula,

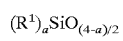

wherein $R^1$ is $C_{(1-6)}$ alkyl and a is 0 to 3.

Alkyl groups which $R^1$ can represent include methyl, ethyl, propyl, isopropyl, butyl, sec.butyl, pentyl and hexyl. Preferred soft silicones are those in which $R^1$ is methyl.

Preferred curable poly($C_{(1-6)}$ alkyl)arylsiloxane polymers are heat-curable siloxanes, however peroxide-curable siloxanes can also be used with conventional initiators. Heat curable siloxane polymers include he hydroxy-functionalized organopolysiloxanes belonging to the classes of silicones known as "hard" and "soft" silicones. Preferred hard and soft silicones are silanol-terminated polyfunctional organopolysiloxanes containing repeating units of the formula,

Wherein:

$R^1$ and $R^2$ are independently ($C_{(1-6)}$ alkyl) or aryl; and a and b are independently 0 to 3.

Alkyl groups which $R^1$ and $R^2$ can represent include methyl, ethyl, propyl, isopropyl, butyl, sec.butyl, pentyl and hexyl. Preferred hard and soft silicones are those in which $R^1$ and $R^2$ are independently methyl or phenyl.

Both hard and soft silicones can contain various proportions of mono-, di-, tri- and tetra-functional siloxane repeating units. The degree of functionality influences the hardness of the silicone. In general, the greater the functionality the harder is the silicone. However, the predominant influence on hardness is the ratio of aryl to alkyl groups present. Preferred hard silicones are characterized by having a ratio of phenyl to methyl groups greater than 0.5 and are nonflowable, preferably between about 1:1 and 2 to 1. Soft silicones have a ratio of aryl to methyl groups less than 0.5, preferably no aryl groups are present and are flowable. Hard silicones generally have a number-average molecular weight of less than about 10,000, preferably less than about 4,000. Polyfunctional hard silicones of such molecular weights have a high level of crosslinking on curing which contributes to the hardness. Soft silicones generally have a number-average molecular weight of greater than 20,000, preferably greater than 100,000 which results in a low level of crosslinking on curing hard and soft silicones can be used singly or as mixtures of silicones and, in addition, can contain minor amounts of one or more polyfunctional silicones having number-average molecular weights in the range of 1,000 to 300,000.

Particularly suitable silicones are the heat-curable silanol-terminated hard silicone copolymers comprising difunctional and trifunctional siloxane repeating units of the formulae, $R^3_2SiO$ and $R^4SiO_{1.5}$ wherein $R^3$ and $R^4$ are independently methyl or phenyl provided that the ratio of phenyl to methyl groups is at least about 1 to 1.

Exemplary hard and soft silicones are commercially available or can be prepared by conventional methods. For example, DC6-2230 silicone and DC-806A silicone (sold by Dow Corning Corp.), are hard silicone polymers, and SFR-100 silicone (sold by General Electric Co.) and EC 4952 silicone (sold by Emerson Cummings Co.), are soft silicone polymers. DC6-2230 silicone is characterized as a silanol-terminated polymethyl phenylsiloxane copolymer containing phenyl to methyl groups in a ratio of about 1 to 1, difunctional to trifunctional siloxane units in a ratio of about 0.1 to 1 and having a number-average molecular weight between 2,000 and 4,000. DC 806A silicone is characterized as a silanol-terminated polymethyl phenylsiloxane copolymer containing phenyl to methyl groups in a ratio of about 1 to 1 and having difunctional to trifunctional siloxane units in a ratio of about 0.5 to 1. SFR 100 silicone is characterized as a silanol- or trimethylsilyl-terminated polymethylsiloxane and is a liquid blend comprising about 60–80 weight percent of a difunctional polydimethylsiloxane having a number-average molecular weight of about 150,000 and 20–40 weight percent of a polymethylsilyl silicate resin having monofunctional (i.e. trimethylsiloxane) and tetrafunctional (i.e. $SiO_2$) repeating units in an average ratio of between about 0.8 and 1 to 1, and having a number-average molecular weight of about 2,500. EC 4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000. Other polyfunctional poly($C_{(1-6)}$ alkyl)siloxane polymers which can be used are disclosed in U.S. Pat. Nos. 4,387,176 and 4,536,529, the disclosures of which are hereby incorporated by reference.

Preferred compositions of the invention have a ratio of siloxane polymer to fluorocarbon copolymer between about 0.1 and 3 to 1 by weight, preferably between about 0.2 and 0.5 to 1. The composite is preferably obtained by curing a mixture comprising from about 50–70 weight percent of a fluorocarbon copolymer, 10–30 weight percent of a curable polyfunctional polymethylsiloxane polymer, most preferably about 20–30 weight percent, 1–10 weight percent of a fluorocarbon-curing agent, 1–10 weight percent of a fluorocarbon-curing accelerator, 9–30 weight percent of an acid acceptor type filler, and 0–30 weight percent of an inert filler.

Curing of the composite is carried out according to the well known conditions for curing vinylidene fluoride based copolymers ranging, for example, from about 12–48 hours at temperatures of between 50° C. to 250° C. Preferably the coated composition is dried until solvent free at room temperature, then gradually heated to about 230° C. over 24 hours, then maintained at that temperature for 24 hours.

In accordance with the present invention, the coated article can be a fusing member in the form of a roll, belt or any surface having a suitable configuration for fixing or fusing a thermoplastic toner image to a receiver such as a paper sheet. The underlying structure onto which the coating is applied is called the substrate. When used with fusing rolls, substrate onto which the composite of the invention can be coated directly on is the fusing roll core preferably the coating is applied on an underlying intermediate layer which is bonded directly or indirectly to the core. This intermediate layer is preferably a silicone elastomer, for example, EC 4952 silicone (sold by Emerson Cummings Co.). When the fusing member is in the form of a belt, the belt comprises a continuous flexible substrate made of metal or polymeric material onto which the composite of the invention can be coated. The fusing members can be coated by conventional techniques, however, solvent transfer coating techniques are preferred.

Coating solvents which can be used include polar solvents, for example, ketones, acetates and the like. Preferred solvents for the fluoroelastomer based composites are the ketones, especially methyl ethyl ketone and methyl isobutyl ketone. The composites of the invention are dispersed in the coating solvent at a concentration of between about 10 to 50 weight percent, preferably between about 20 to 30 weight percent and coated on the fusing member to give a 10 to 100 μm thick sheet on drying. The coated article is cured under the conditions described above.

The cured coatings of the invention have low surface energies and exhibit good adhesion to underlying layers and substrates. Such coatings have excellent resistance to abrasion as measured on a Norman Abrader apparatus and retain the advantageous mechanical and chemical properties characteristic of fluoroelastomers, such as hardness, elongation, tensile and tear strength and resistance to releasing oils. In addition, when evaluated as image-fixing media, the coatings have shown minimal reactivity with thermoplastic toner powders while showing desirable release properties with minimal or no offsettings under simulated fusing conditions.

The rolls and belts produced in accordance with the present invention are thus useful in electro-photographic copying machines to fuse heat-softenable toner to an image carrying receiver sheet. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

The following examples illustrate the compounding, coating, curing and testing of fluorocarbon-silicone polymeric compositions.

The SFR-100 silicone used on the examples described below was obtained from General Electric Co. and was determined by size exclusion chromatography and NMR to consist essentially of a mixture of about 70 weight percent of a polydimethylsiloxane having a number-average molecular weight of about 150,000, and about 30 weight percent of a polytrimethylsilyl silicate resin having monofunctional and tetrafunctional repeating units in an average ratio of about 0.9 to 1 and having a number-average molecular weight of about 2,480.

EXAMPLE 1

Viton® A fluoropolymer (500 g), benzyl triphenylphosphonium chloride (30 g), calcium hydroxide (30 g), Magnesium oxide (Maglite D) (15 g), and 2,2-bis(4-hydroxyphenyl) hexafluoropropane (12.5 g) were thoroughly compounded for 60 minutes in a two-roll mill at 63° F. (approx. 17° C.) with water cooling until a uniform, dry composite sheet was obtained. The uniform, dry, flexible composite sheet obtained was divided into small pieces. SFR-100 silicone (20 g) was added to 117.5 g of the composite sheet and both were suspended in a 85% methyl ethyl ketone and 15% methanol solution to form a 30 weight percent coating dispersion. Dispersion was formed by roll milling for approximately 3 hours. A testing sample was made according to the following procedure. An aluminum core was cleaned and then primed with a thin layer of silicone primer and dried in ambient air before application of the base cushion. The base cushion, a 90 mil thick polydimethylsiloxane was blade coated to a dry thickness of 0.090 inches and cured for 24 hours at 70° F., 50% RH, 3 hours ramp to 410° F. and then 12 hours at 410° F. The roll was then surface ground. After grinding, the base cushion was corona treated for 1 minute at 750 watts, at 25 revolutions per minute. The above described dispersion was degassed for 2 minutes under 25 mm Hg before it was ring coated onto the base cushion layer. The fuser roller was cured by air drying for 1 hour followed by 24 hours ramp to 230° C. and then 24 hours at 230° C. The dry thickness of the coating on the roller was 1.9 mil.

EXAMPLE 2

Viton® A fluoropolymer (500 g), and DC6-2230 (50 g) (where the DC6-2230 is a polyfunctional poly($C_{(1-6)}$ alkyl) phenylsiloxane polymer) benzyl triphenylphosphonium chloride (30 g), calcium hydroxide (30 g), Magnesium oxide (Maglite D) (15 g), and 2,2-bis(4-hydroxyphenyl) hexafluoropropane (12.5 g) were thoroughly compounded for 60 minutes in a two-roll mill at 63° F. (approx. 17° C.) with water cooling until a uniform, dry composite sheet was obtained. The dispersion was made following essentially the same procedure as described in Example 1 except that 10 parts of SFR-100 silicone per 100 parts of the Viton® A. A coated fuser roller was made as described in Example 1 using this composite.

COMPARATIVE EXAMPLE 1

This sample was prepared according to U.S. Pat. No. 5,582,917, Example 1.

Viton A fluoropolymer (500 g), benzyl triphenylphosphonium chloride (30 g), calcium hydroxide (60 g), and Magnesium Oxide (Maglite D) (15g) were thoroughly compounded for 60 minutes in a two-roll mill at 63° F. (approx. 17° C.) with water cooling until a uniform, dry composite sheet was obtained. SFR-100 silicone (80 g) was added to the composite sheet at a rate of 0.25 g every five minutes and allowed to band evenly before each addition. The temperature was maintained at 63° F. during the addition which took place over four days until approximately 65 g had been added. The balance of the oil was then added at a rate of 2 g every five minutes until addition was complete. The cooling water was turned off and milling was continued for one hour until a uniform smooth composite sheet was obtained. The cooling water was again turned on and 2,2-bis(4-hydroxyphenyl) hexafluoropropane (12.5 g) was added and milled for one hour. A uniform, dry, flexible composite sheet was thus obtained. This composite sheet was used to make various testing samples according to the following description.

The last sample type prepared was a coated fuser roller. It was made according to the following description. An aluminum core was cleaned and then primed with a thin layer of silicone primer and dried in ambient air before application of the base cushion. The base cushion, a 90 mil thick polydimethylsiloxane was blade coated to a dry thickness of 0.090 inches and cured for 24 hours at 70° F., 50% RH, 3 hours ramp to 410° F. and then 12 hours at 410° F. The roll was then surface ground and cured again for 24 hours ramp to 450° F. and then 24 hours at 450° F. After curing, the base cushion was corona treated for 1 minute at 750 watts, at 25 revolutions per minute. The uniform, dry, flexible composite sheet obtained was divided into small pieces and suspended in a 85 wt % methyl ethyl ketone 15 wt % methanol solution to form a 25 weight percent coating dispersion.

The resulting solution was similarly ring coated on a fuser roller as in Example 1. The fuser roller was cured by air drying for 1 hour followed by 24 hours ramp to 230° C. and then 24 hours at 230° C. The dry thickness of the coating on the roller was 0.8 mil.

COMPARATIVE EXAMPLE 2

This sample was prepared according to U.S. Pat. No. 4,853,737 Example 1.

Eight hundred grams of Viton A was banded on a 2 roll mill. 160 g of carbon black, 120 g of lead mono-oxide, 20 g of triphenylphosphonium chloride and 48 g 2,2-bis(4-hydroxyphenyl) hexafluoropropane were mixed to obtain a uniform blend and then added across the length of the roll. The mixture was blended for 1 hour until a uniform composition was obtained.

The premilled blend and 40 g .alpha.-.omega.-aminopropyl terminated polydimethylsiloxane were dispersed in water-free methyl ethyl ketone with stirring for 12 hours. The dispersion was stirred slowly to avoid settling and kept sealed to prevent solvent loss. The dispersion was 10% solids by weight and had a viscosity of 22 cp. Two sample types were prepared. A coated fuser roller was prepared by ring-coating the dispersion onto the base cushion layer on an aluminum core. (The aluminum core and the base cushion layer were prepared as described in Example 1.) The fuser roller was cured by air drying for 1 hour followed by 24 hours ramp to 230° C. and then 24 hours at 230° C. The dry thickness of the coating on the roller was about 1 mil.

Testing of Fluorocarbon Copolymer-Silicone Composites

Surface Energy Measurement and Wear Rate

The surface energy of the rollers was determined from contact angle measurements of distilled water and diiodomethane using Rame-Hart Inc., NRL model A-100 contact angle Goniometer.

The wear rate test of compression-molded slabs was performed using a Norman Abrader Device (Norman Tool Inc., Ind.). For this test, the Abrader Device was modified by replacing the standard grommet wheel with an aluminum rod (1.1 inch in length and 0.625 inch in diameter), placing a renewable paper strip on the samples, and running the tests at about 350° F. Cycles were accumulated until coating failure.

| Sample | wear (cycles/mil) | Surface Energy (dyne/cm) |
|---|---|---|
| EX 1 | 200 | 30.8 |
| EX 2 | 133 | 27.5 |
| CE 1 | 200 | 31.8 |
| CE 2 | 50 | 25 |

Toner Release Test

The test samples are employed to evaluate the toner offset and release force characteristics of the fuser member coating. Two samples are cut approximately 1-inch square of each example. One of these squares is left untreated by release agent (the dry sample). To the surface of the other sample is applied in unmeasured amount of Xerox amino-functionalized PDMS 8R79.

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample is tested in the following manner:

A one-inch square of paper covered with unfused polyester toner is placed in contact with a sample on a bed heated to 175° C., and a pressure roller set for 80 psi is locked in place over the laminate to form a nip. After 20 minutes the roller is released from the laminate.

The extent of offset for each sample is determined by microscopic examination of the sample surface following delamination. The following numerical evaluation, corresponding to the amount of toner remaining on the surface, is employed.

0% offset
2 1–20% offset
3 21–50% offset
4 51–90% offset
5 91–100% offset

Qualitative assessment of the force required for delamination of the aper from the sample is as follows:

1 low release force
2 moderate release force
3 high release force

| Sample | Release/Offset - Dry | Release/Offset - $NH_3$ |
|---|---|---|
| EX 1 | 1/2 | 1/2 |
| EX 2 | 1/2 | 1/2 |
| CE 1 | 1/2 | 1/2 |
| CE 2 | 2/3 | 1/2 |

The coated articles of this invention, particularly the fuser rollers, possess extremely desirable physical and mechanical characteristics as indicated in the test results above. The fuser rollers have excellent toner release properties, without sacrificing toughness and abrasion resistance. The coating materials exhibit these desirable properties when they are prepared according to the process of this invention.

The invention has been described in detail with particular reference to certain preferred embodiments thereof, but it will be understood that variations and modifications can be effected within the spirit and scope of the invention.

What is claimed is:

1. A method of making a polymeric composition comprising a fluorocarbon-silicone interpenetrating network, comprising the steps of:

a) mechanically compounding a fluorocarbon copolymer and metal oxide or hydroxide acid acceptor to form a homogenous mixture; and b) dispersing in solvent the mixture formed by step a) with a polymer selected from a curable polyfunctional poly($C_{(1-6)}$ alkyl)siloxane polymer; a curable polyfunctional poly($C_{(1-6)}$ alkyl)arylsiloxane polymer; and combinations thereof, and c) solution milling the dispersion of b) to form a homogenous blend.

2. The method of claim 1 further comprising the step of:

adding, a fluorocarbon-curing agent and a fluorocarbon-curing accelerator.

3. The method of claim 1 wherein the polymeric composition further comprises at least one filler.

4. The method according to claim 3, wherein the polymeric composition comprises:

about 50–70 weight percent of a fluorocarbon copolymer;
    about 1–50 weight percent of a curable siloxane polymer;
    about 1–10 weight percent of a fluorocarbon curing agent;
    about 1–12 weight percent of a fluorocarbon-curing accelerator;
    about 4–30 weight percent of an acid acceptor filler; and,
    about 0–30 weight percent of an inert filler;
    all on a 100 weight percent basis.

5. The method according to claim 1 whereby the siloxane polymer is selected from a) at least one curable silanol-terminated, polyfunctional poly($C_{1-6}$ alkyl)siloxane polymer comprising at least two different functional siloxane units selected from the group consisting of monofunctional, difunctional, trifunctional and tetrafunctional siloxane units;

b) at least one curable, silanol-terminated, polyfunctional poly($C_{1-6}$ alkyl)arylsiloxane polymers, said siloxane polymer comprising at least two different functional siloxane units selected from the group consisting of monofunctional, difunctional, trifunctional and tetrafunctional siloxane units; and c) combinations of a) and b).

6. The method according to claim 1, wherein the curable siloxane polymers of claim 5 is a heat-curable polymer.

7. The method according to claim 5 wherein said polyfunctional poly($C_{1-6}$ alkyl)arylsiloxane polymer is a hard silicone copolymer comprising repeating units of the formula:

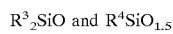

wherein $R^3$ and $R^4$ are independently $C_{1-6}$ alkyl or aryl, provided that the molar ratio of aryl: $C_{1-6}$ alkyl groups is greater than 1:1.

8. The method according to claim 1, wherein the curable polyfunctional poly($C_{(1-6)}$ alkyl)siloxane polymer comprises a silicone polymer comprising repeating units of the formula, $$(R^1{}_a SiO_{(4-a)/2});$$

wherein $R^1$ is $C_{(1-6)}$ alkyl and a is 0–3.

9. The method according to claim 8 wherein $R^1$ is methyl.

10. The method according to claim 9, wherein the silicone polymer comprises a polydimethylsiloxane having a number average molecular weight between 20,000 and 300,000 and a polymethylsiloxane comprising monofunctional and tetrafunctional siloxane repeating units and having a number average molecular weight between 1,000 and 10,000.

11. The method according to claim 10 wherein the silicone polymer comprises a silanol- or trimethylsilyl-terminated polymethylsiloxane and is a liquid blend comprising about 60 to 80 weight percent of a difunctional polydimethylsiloxane having a number average molecular weight of about 150,000, and 20 to 40 weight percent of a polytrimethylsilyl silicate resin having monofunctional and tetrafunctional repeating units in an average ratio of between 0.8 and 1 to 1, and having a number average molecular weight of about 2,200.

12. The method according to claim 1, wherein the fluorocarbon copolymer comprises monomers selected from the group consisting of vinylidene fluoride, tetrafluoroethylene, and hexafluoropropylene.

13. The method according to claim 12 wherein, in the polymeric composition, the weight ratio of siloxane polymer: fluorocarbon copolymer is about 0.2 to 0.5:1.0.

14. The method according to claim 1, wherein said siloxane polymer and said fluorocarbon copolymer are present in said polymeric composition in a ratio of 0.1–3.0:1.0 by weight.

15. The method according to claim 1, wherein the fluorocarbon-curing agent is 2,2-bis(4-hydroxyphenyl) hexafluoropropane.

16. A method of coating an article with a polymeric composition comprising the steps of:
    a) preparing the polymeric composition according to the method described in claim 1;
    b) adding a fluorocarbon-curing agent;
    c) removing gasses dissolved in the polymeric composition; and
    d) coating the article with the polymeric composition.

17. The method of claim 16 wherein the polymeric composition further comprises a fluorocarbon-curing accelerator for curing the fluorocarbon copolymer with the fluorocarbon-curing agent.

* * * * *